United States Patent
Komai et al.

(10) Patent No.: US 7,143,481 B2
(45) Date of Patent: Dec. 5, 2006

(54) FIXING RING FOR FLEXIBLE PIPE TO MANHOLE JOINT

(75) Inventors: Tomomasa Komai, Nishinomiya (JP);
Shigeharu Miki, Toyonaka (JP);
Wataru Shiota, Yamatokoriyama (JP)

(73) Assignee: Miki Manufacturing Co., Ltd., Osaka-Fu (JP)

( * ) Notice: Subject to any disclaimer, the term of this patent is extended or adjusted under 35 U.S.C. 154(b) by 42 days.

(21) Appl. No.: 11/022,208

(22) Filed: Dec. 23, 2004

(65) Prior Publication Data
US 2005/0155189 A1    Jul. 21, 2005

(30) Foreign Application Priority Data
Jan. 15, 2004   (JP) .............................. 2004-008326

(51) Int. Cl.
*F16L 33/02* (2006.01)
*F16L 41/08* (2006.01)

(52) U.S. Cl. ...................... 24/20 R; 285/370
(58) Field of Classification Search .................... 24/19, 24/20 R, 25, 20 EE, 268, 20 LS, 279, 280; 285/216–218, 230, 370, 235–237, 379, 420, 285/FOR. 144; 277/634, 635, 616, FOR. 219; 464/173, 175
See application file for complete search history.

(56) References Cited

U.S. PATENT DOCUMENTS

| | | | | |
|---|---|---|---|---|
| 28,187 | A * | 5/1860 | Loughborough | 24/25 |
| 1,915,720 | A * | 6/1933 | De Vulitch | 24/21 |
| 3,960,395 | A * | 6/1976 | Cirule et al. | 285/370 |
| 4,890,863 | A * | 1/1990 | Westhoff et al. | 277/606 |
| 5,076,618 | A * | 12/1991 | Bridges | 285/370 |
| 5,291,637 | A * | 3/1994 | Meyers | 24/25 |
| 5,333,360 | A * | 8/1994 | Oetiker | 24/20 R |
| 5,431,459 | A * | 7/1995 | Gundy | 285/237 |
| 5,507,500 | A * | 4/1996 | Skinner et al. | 277/606 |
| 5,549,334 | A * | 8/1996 | Zeisler et al. | 285/189 |
| 5,732,446 | A * | 3/1998 | Blanks | 24/25 |
| 5,738,359 | A * | 4/1998 | Gundy | 277/606 |
| 5,850,674 | A * | 12/1998 | Jansen | 24/21 |
| 6,076,235 | A * | 6/2000 | Khokhar | 24/25 |
| 6,641,176 | B1 * | 11/2003 | Brockway | 285/230 |
| 6,921,085 | B1 * | 7/2005 | Mirales et al. | 277/606 |

FOREIGN PATENT DOCUMENTS

| | | |
|---|---|---|
| JP | 02-051693 | 2/1990 |
| JP | 09-144043 | 6/1997 |
| JP | 10-195900 | 7/1998 |
| JP | 11-013078 | 1/1999 |
| JP | 2003-130265 | 5/2003 |
| WO | WO 83/02144 | * 6/1983 |

* cited by examiner

*Primary Examiner*—Robert J. Sandy
*Assistant Examiner*—Ruth C. Rodriguez
(74) *Attorney, Agent, or Firm*—J.C. Patents

(57) ABSTRACT

The object of the present invention that a fixing ring is provided, which has annular ring form made of strip materials and is mounted in a bore or on a outside surface of flexible joints for piping, and not only has compact form and structure but also can be adjusted stepless and fixed through wide range. An inclined plate member, which is positioned on the inner or outer surface of a strip material with a certain tapered space, is fixed at ends of inner surface side or outer surface side of a strip material in order to be fixed in overlapped situation. A roller is disposed in the certain tapered space as it can roll freely along circumferential direction. The other end of the strip material is inserted between the one end of a strip material and the roller.

3 Claims, 6 Drawing Sheets (A)   (B)

(A)

(B)

(A)

(B)

(C)

FIXING RING FOR FLEXIBLE PIPE TO MANHOLE JOINT

FIELD OF THE INVENTION

The present invention relates to a fixing ring adapted for fixing a flexible pipe to a manhole joint, and particularly relates to a fixing ring adapted for fixing a flexible rubber joint to a connecting pipe in a manhole for sewage.

BACKGROUND OF THE INVENTION

Wastewater flows through the sewage piping in the underground, and the piping is disposed nearly horizontal and connected with a manhole, although the piping lies somewhat inclined to let water flow down.

In order to connect the piping with the manhole, the so-called flexible joint is used, which can absorb vibrations by earthquake or passing of vehicles, stratum change by earthquake, or offsets between the position of side hole drilled on the manhole and the position of the piping laid.

FIG. 5 shows one of conventional embodiments with a flexible joint 43. This flexible joint 43 has normally straight or tapered cylindrical form made of rubber. One end of the joint is fixed over the outside of the sewage piping 40 with a fixing ring 44, and another end is fixed with another kind of fixing ring 45 from inside of the flexible joint 43, after the piping is inserted into the side hole 42 of a manhole 41. The latter fixing ring 45 is normally annular strip material and fixes joints through expanding the fixing ring from inside. Thereby the clearance between the flexible joint 43 and the inner surface of a side hole 42 on the manhole 41 is shut, and the sealing of connecting position is ensured. It is on safety aspect functionally required for the connecting position that water may not leak not only at horizontal position but also at inclined or offset position of the piping 40 under hydraulic pressure of 1013 hPa.

It is possible not at construction site through pre-mounting to connect a flexible joint 43 onto the outer diameter of piping 40. And even if mounting should be done at construction site, there is so much space around the outside of joints 43 that mounting is easy and simply.

However in order to mount and fix the flexible joint 43 in the bore of side hole 42 on a manhole 41, the flexible ring 45 must be mounted and fixed from inside of a manhole, whereby the inner diameter of piping 40 is small as 30 cm for example as the case may be, then the use of tolls and the process of mounting is considerably restricted. Additionally the inside of a fixing ring 45 may not have large projection in respect to water flow and damage of rubber joint. Thereby it is required that the fixing ring is compact, mountable also in narrow space and sure not to cause water leakage.

In respect to fixing rings 45, many types of rings are proposed (for example see Japanese Patent Public Disclosures [KOKAI] No. 11-13078, 10-195900 and 9-144043). FIG. 6 shows one of them. In this case, the diameter of an annular strip material is enlarged through expanding the space between both ends 50a, 50b by using proper tools, and a spacer 51 is inserted into the space to keep the expanded diameter.

This type has simple construction, however must have many different spacers 51 corresponding to diameters. In order to accommodate to the real diameter of machined side holes 42 of a manhole, plurality of spacers 51 may have to be used in combination. Additionally it must be mounted with tools within narrow space in a flexible joint, so the combined spacers 51 cannot be easily inserted into narrow space.

FIG. 7 shows another one of conventional arts. In this type, both ends of metal fittings 56, which has V-form and is free extensible, are inserted or welded between both ends 55a, 55b of annular strip material 55. On mounting, this fixing ring 55 is set on the point to be fixed inside the flexible joint, and tools like jack, which expands the fixing ring, are placed between the peak of metal fitting 56 and the opposite point of 180°, and it extends the distance. The metal fitting 56 is crashed through extending the diameter and the circumference is enlarged. The fixing ring 55 is forced onto the inner surface of a flexible joint and fixes it.

This method has merit that it consists of a few components, but it cannot accommodate the dimension difference of side holes. Namely, tools are wearing, every time the side holes 42 are machined, and the inner diameter of side holes becomes smaller corresponding to the tool diameter. So at first it is required to machine the hole in largest dimension, thereby difference of fitting occurs between the largest and smallest diameter of side holes 42. And it can be only used in one nominal dimension. Though nominal dimension changes a little bit, many fixing rings 55 of different dimensions have to be stocked.

FIG. 8 shows also another one of embodiments according to conventional arts. The embodiment comprises two tapered slide of the expanded portion 63, 64. Namely, on both ends 60a, 60b of the annular fixing ring 60, two tapered slide 63, 64 are provided, two faces of which opposite to each other are wedge-formed. Tapered spacers 61, 62 with the same angle are disposed between them.

The tapered spacers 61, 62 come closer to each other through tightening the screws penetrating the tapered spacers 61, 62, then both ends 60a, 60b with tapered slides 63, 64 are pushed out to the opposite side and the flexible ring is fixed.

This method is more complex as the fore-mentioned method, but has merit that the both ends 60a, 60b of a fixing ring 60 can be expanded stepless.

However the axial dimension of expanding portion becomes larger, and the dimension range to be adjusted is also limited, nevertheless it is called as stepless.

Accordingly, the object of the present invention is to provide a fixing ring, which not only has compact form and structure but also can be adjusted stepless and fixed through wide range.

SUMMARY OF THE INVENTION

In order to solve the fore-mentioned object, the fixing ring for flexible joints of the present invention is a fixing ring that has annular ring form made of strip materials and is mounted in the bore or on the outside surface of flexible joints for piping, wherein the ring is characterized in that a inclined plate member, which is positioned on the inner or outer surface with a certain tapered space, is disposed at one end of inner surface side or outer surface side of a strip material in order to fix in overlapped situation, that a roller is disposed in the certain tapered space as it can roll freely along circumferential direction, and that another end of the strip material is inserted between the one end of strip material and the roller (the first invention).

It is also characterized that the roller can be additionally pushed with a spring(s) in the direction, that the certain tapered space between one end of the strip material and the inclined plate member becomes narrow (the second invention).

And it is characterized that the inclined plate member can be fixed with a screw against the one end of the strip material (the third invention).

The inclined plate member is fixed on the inner side of the strip material, when being mounted in the bore of flexible joint 43 as the fixing ring 45 shown in FIG. 5. However when it is mounted on the outer side of the flexible joint 43 like the fixing ring 44, then it is fixed on the outer side of the strip material.

According to the fore-mentioned construction, advantageous effects can be obtained as follows:

1. Through simple handling like expanding or shortening the diameter, the annular strip material can be fixed inside the bore or outside of flexible joints easily and in a short time.
2. The diameter of fixing rings can be adjusted stepless within the length of an annular strip material so that only one kind of rings can fix many kinds of flexible joints having different dimensions.
3. The invention can be basically embodied only through addition of a roller and a inclined plate member to an annular strip material, so that the fixing rings can be constructed thin and compact, and manufactured with low cost. Especially it is convenient, when being mounted inside of the bore of flexible joints, where the space is limited.
4. The roller is engaged between a inclined plate member and a strip material with backing force after the annular strip material is expanded or tensed, so that the fixing force is very surely and strong.

DETAILED DESCRIPTION OF THE PREFERRED EMBODIMENTS

Figure 1:
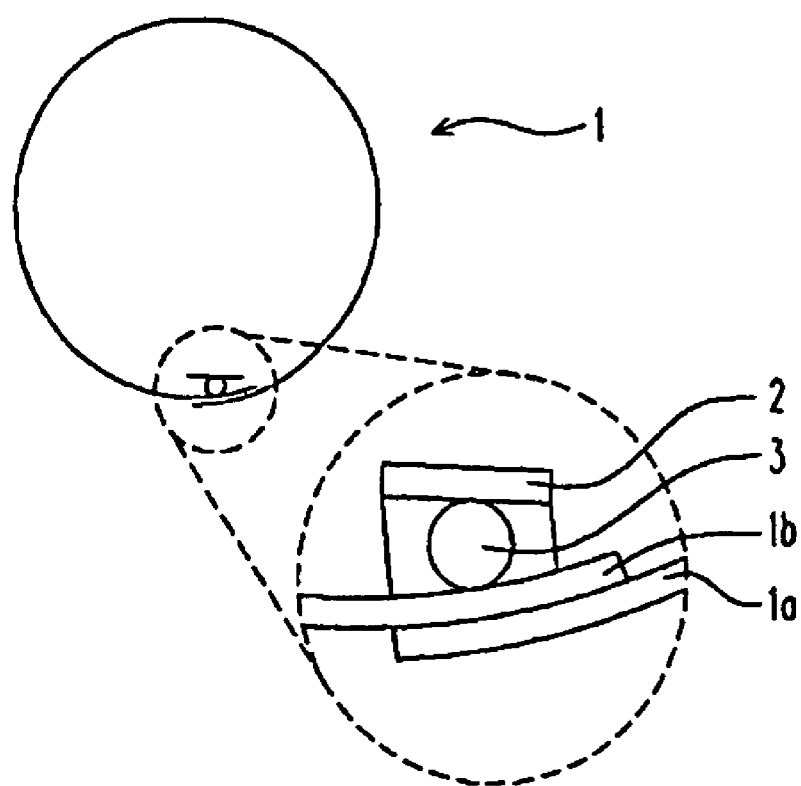
FIG. 1 shows the principle of the fixing ring for flexible joints according to present invention.

FIG. 1 shows the principle of the present invention when it is applied to mounting inside of flexible joints. As is obviously from the figure, a inclined plate member, which is formed being narrow toward the direction where another end 1b is put into (the diameter of ring becomes smaller), is fixedly attached on the inside of one end 1a of annular strip material made of steel. Between the inclined plate 2 and another end 1b of a strip material, a roller 3 is disposed in the direction that the roller can roll in circumferential direction freely. The roller 3 is hold in contact with the inclined plate member 2 and the end 1b of a strip material by proper way.

The angle to be made between the inclined plate member 2 and the other end 1b of a strip material may be preferably within a range 3 to 25 degree, in order that the roller can be surely engaged between the inclined plate member 2 and the other end 1b of a strip material when the other end 1b of a strip material is pushed into. Further this angle is more preferably within 5 to 20 degree and most preferably within 8 to 15 degree. The strip material 1, inclined plate member 2 and rollers 3 are preferably made of stainless steel that is anticorrosive.

The other end 1b of a strip material constructed as fore-mentioned is placed at first on the position, where is most put into (minimal inner diameter). A fixing ring is inserted into inside of a flexible joint, and the other end 1b of a strip material is relatively pulled out through expanding of the fixing ring with a proper tool like a jack. At this time the roller 3 rolls toward the direction where it departs from the inclined plate member 2, then the other end 1b of a strip material is easily pulled out toward left in FIG. 1, and the ring can be expanded.

On the other hand, after the other end 1b of the strip material was pulled out, and when the other end 1b is forced in the right direction in FIG. 1 by shrinking force of the flexible joint, the roller 3 tends to roll counterclockwise because of friction between the other end 1b and roller 3, but cannot move through engaging like wedge, and is hold at the same position. That is, the other end 1b of a strip material can move in the direction to expand, however can never move in the direction to shrink.

In the foregoing description, it is described that the fixing ring is provided inside of a flexible joint. However it can be used on quite same principle as a fixing ring for outer circumference of a flexible joint. In this case, it is obvious that the inclined plate member 2 is disposed on the circumference of a fixing ring. Then the other end 1b of strip material can move in the direction to shrink, but can never move in the direction to expand.

Embodiment 1

Figure 2:
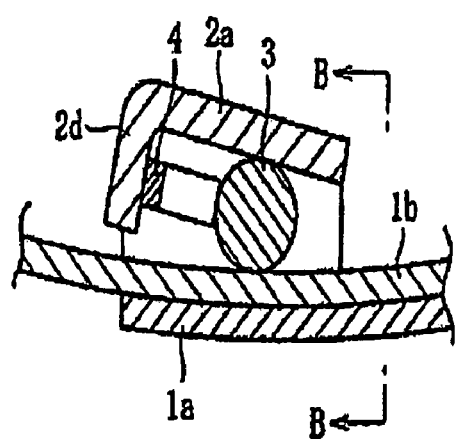
FIG. 2 shows the first embodiment, of which (A) is a sectional drawing of main portion, and (B) is a sectional drawing seen from B—B line of (A).
Figure 2:
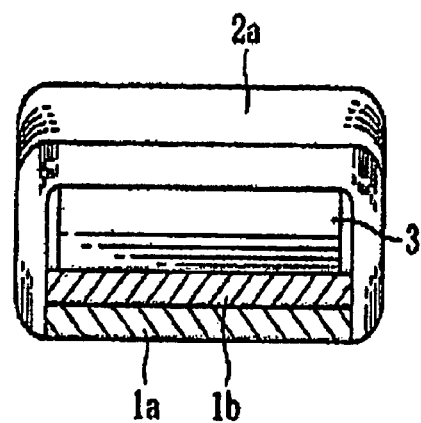

FIGS. 2(A) and 2(B) show the first embodiment of the present invention. In this embodiment, an inclined plate member 2a, which is L-formed in the cross section (gantry-formed in front view as shown in FIG. 2(B)), is attached on one end of a strip material.

A roller 3 is disposed between the other end 1b of a strip material and the inclined plate member 2a. And the center of back face of a bow-shaped leaf spring 4 is placed in contact with the spring supporting portion 2d, which is formed on the inclined plate member 2a in unit. The roller 3 is pushed constantly by both ends of the leaf spring, so that the contact between the roller 3 and the inclined plate member 2a, and between the roller 3 and the other end 2b of the strip material can be hold.

In the application, such that the fixing ring is expanded not again after the fixing ring is once fixed, a spring 4 is not always necessary, when the contact between the other end 1b of a strip material, inclined plate member 2a and roller 3 is surely hold after the roller has been stuffed with proper way. It is of course possible to use any other springs as alternate of leaf springs 4.

Embodiment 2

Figure 3:
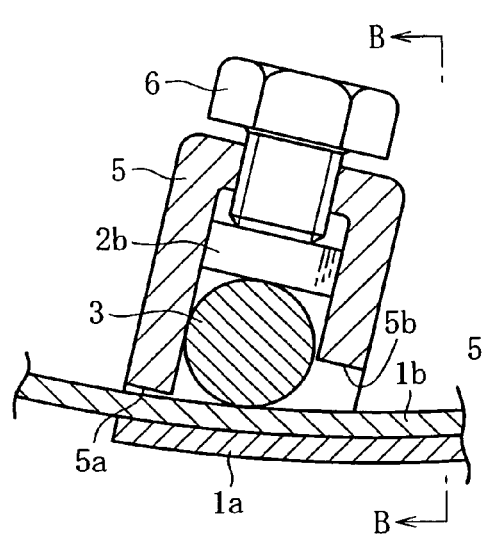
FIG. 3 shows the second embodiment, of which (A) is a sectional drawing of main portion and (B) is a sectional drawing seen from B—B line of (A).
Figure 3:
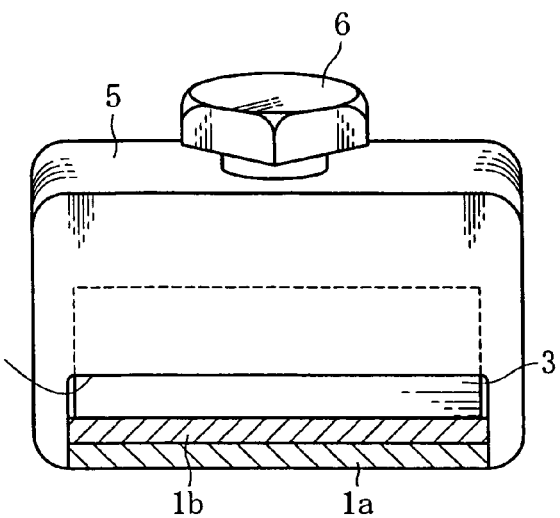

FIGS. 3(A), (B) show the second embodiment of the present invention. In this embodiment, a box-formed plate member 5 is welded on one end 1*a* of a strip material in inclined state, and a roller 3 and movable plate 2*b*, which are possibly fixed with a screw 6, are accommodated inside of the box-formed plate member. The other end 2*b* of a strip material is inserted from a front slit 5*a* and pulled out from the rear slit 5*b* of the box-formed plate member.

This embodiment is effective in such application, that the pulled out length of the other end 1*b* is not varied after once fixed. After the other end 1*b* of a strip material has been pulled out, the movable plate 2*b* is fixed tight with a screw 6 in the direction to press a roller 3.

Nevertheless this differs from such a usual fixing way, that one end 1*a* and another end 1*b* of a strip material are piled up and fixed only with a screw, in the following point. That is, in case of fixing only with a screw, when the pushing force of the end 1*b* of a strip material (force to loose the fixing force against the flexible joint) exceeds the fixing force only with a screw 6, then the other end 1*b* slips out. On the other hand, when a movable plate 2*b* in an inclined box-formed housing is used as fore described, the other end 1*b* encroaches between a roller 3 and the end 1*a* of a strip material, so that the fixing is more strengthened.

Embodiment 3

Figure 4:
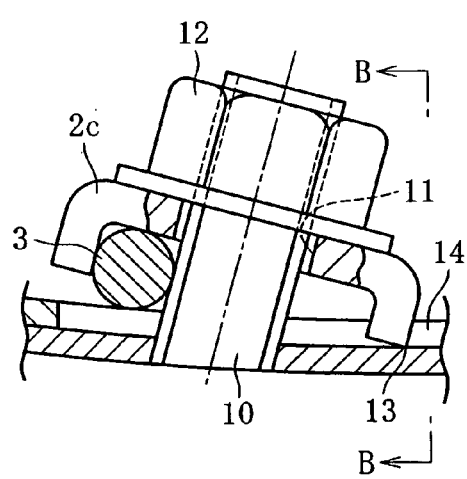
FIG. 4 shows the third embodiment, of which (A) is a sectional drawing of main portion, (B) is a sectional drawing seen from B—B line of (A), and (C) is a top view of the other end of a strip material
Figure 4:
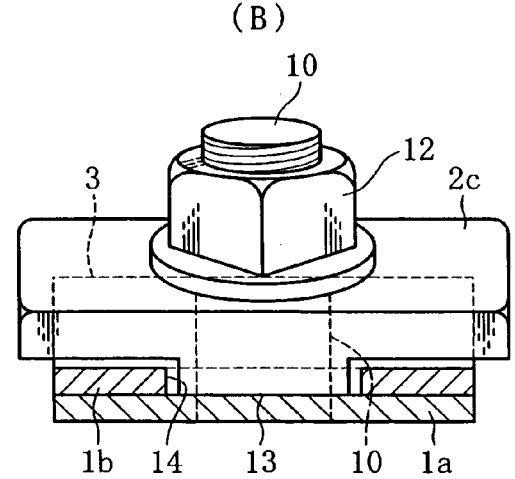
Figure 4:
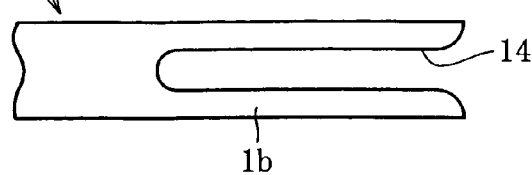
Figure 5:
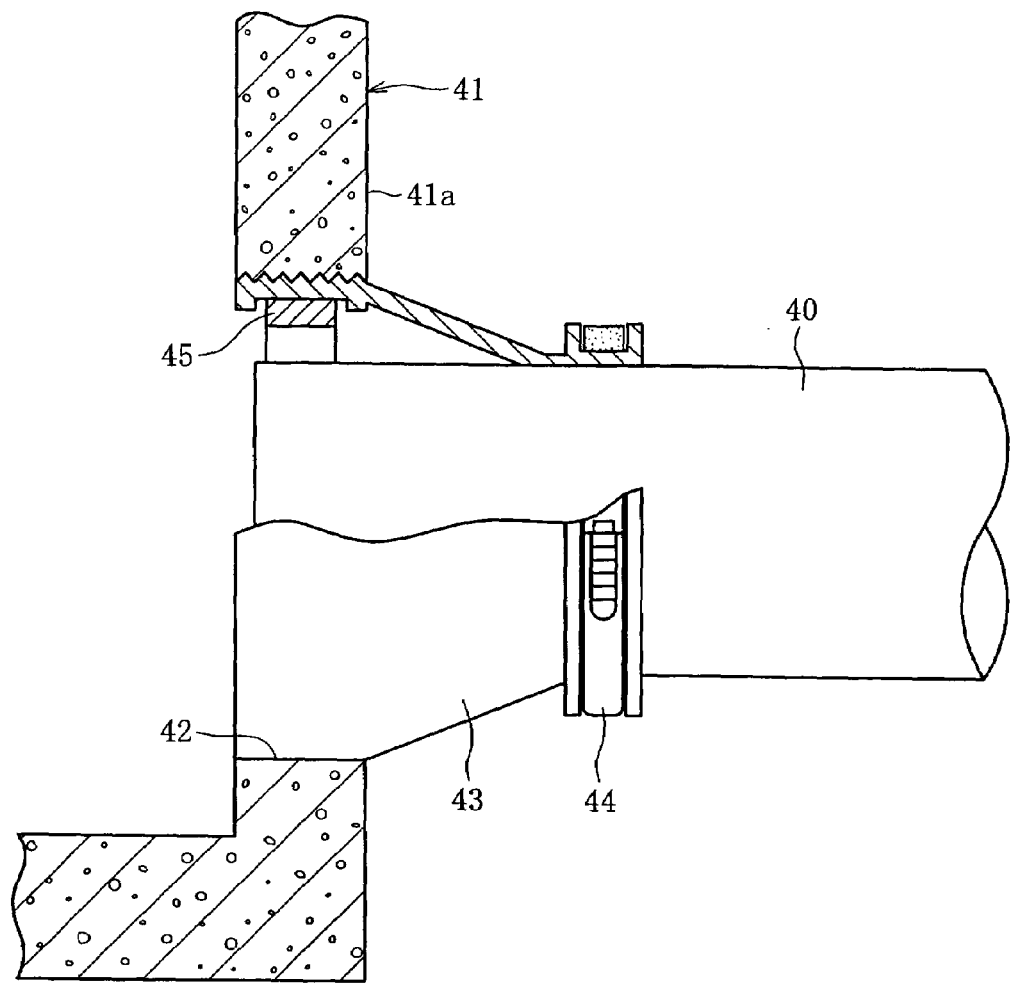
FIG. 5 shows a sectional drawing, which represents an example of conventional art in a manhole.
Figure 6:
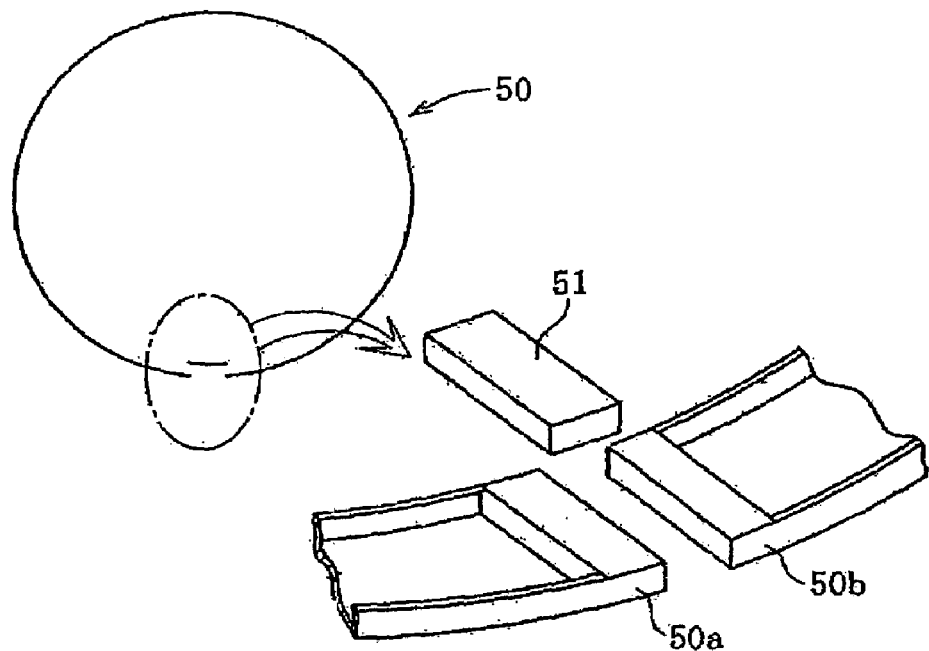
FIG. 6 shows a perspective view of main portion of a conventional fixing ring for flexible joints.
Figure 7:
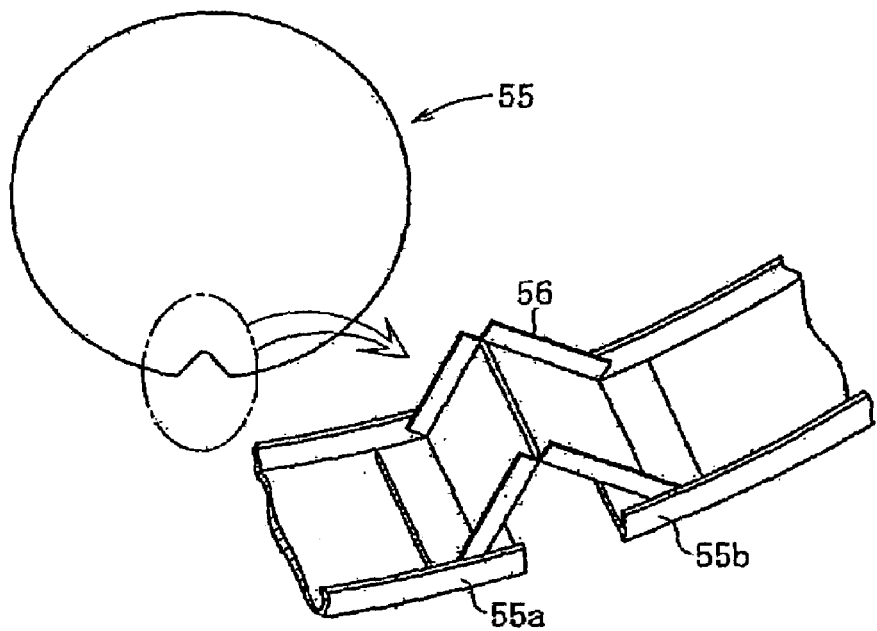
FIG. 7 shows a perspective view of main portion of a conventional fixing ring for flexible joints.
Figure 8:
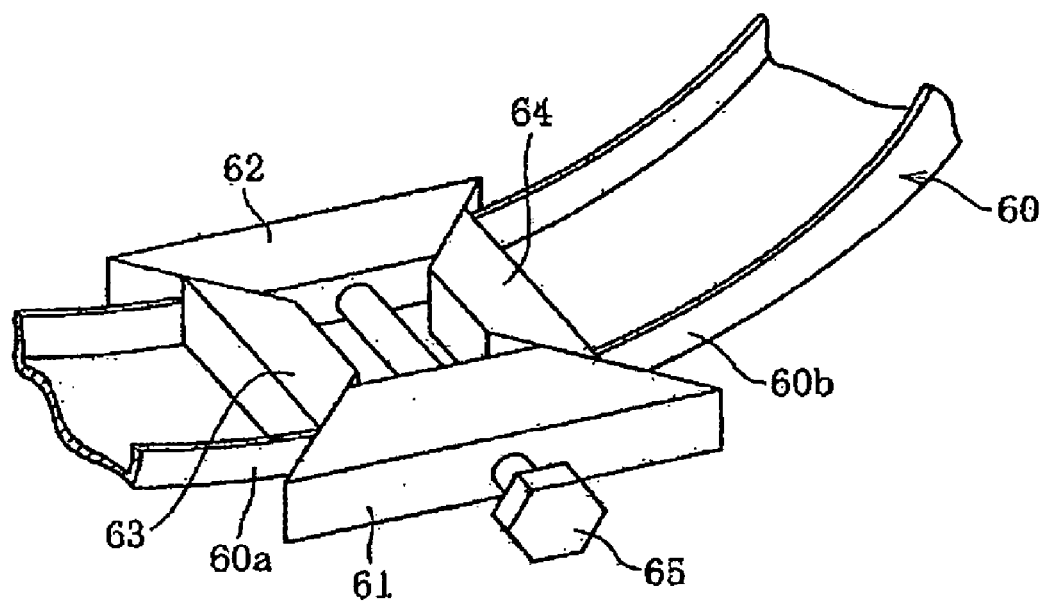
FIG. 8 shows a perspective view of main portion of a conventional fixing ring for flexible joints.

FIGS. 4(A), (B) show the third embodiment of the present invention. This embodiment is based on the same concept as the second embodiment. However an inclined plate member 2*c* is not fixed on the annular strip material by welding etc., but a screw 10, which is fixed inclined on the end 1*a*, is inserted into a loose hole 11 of the inclined plate member 2*c*. And a nut 12 is fastened engaging with the screw 10, and the roller 3 is pressed with the inclined plate member 2*c* against the other end 1*b* of a strip material. By this time, the end portion 13 serves as a supporting point through contact with the end 1*b*, of the strip material. In the center of the other end 1*b* of a strip material, a long groove 14 with proper length and width is formed in order not to interfere with a screw 10 as shown in FIG. 4(C).

The forms to embody the present invention are explained as fore described. However it is possible to make various modifications and variations based on the technical sprit of claims or equivalents of present invention without limiting by the foregoing embodiments. For example, the inner surface of inclined plate member 2*a* to 2*c*, the outer surface of the roller 3 and the other end 1*b* of a strip material contacted with a roller 3 can be a rough surface or a knurl to increase friction.

It is lastly noted that, in light of the foregoing disclosure, many variations and modifications of the present invention are possible in light of the above teachings. It is therefore to be understood that within the scope of the appended claims, the present invention may be practiced otherwise than as specifically described herein.

What is claimed is:

1. A fixing ring that has annular ring form made of a strip material and is mounted in a bore of flexible joints for piping wherein the ring is characterized in that an inclined plate member, which is positioned on an inner surface side of said strip material with said plate member and said inner surface side defining a certain tapered space, is disposed at one end of said inner surface side of said strip material, that a roller is disposed in said certain tapered space as it can roll freely along a circumferential direction of said ring, and that an other end of said strip material is inserted between said one end of said strip material and said roller in order to expand said ring and to fix said ends of said strip material in an overlapped situation.

2. The fixing ring according to claim 1, wherein a ring is characterized in that said roller can be additionally pushed with spring(s) in a direction, where said certain tapered space between said one end of said strip material and an inclined plate becomes narrow.

3. The fixing ring according to claim 1, wherein said ring is characterized in that said inclined plate member can be fixed with a screw against said one end of said strip material.

* * * * *